(12) United States Patent
Takafuji

(10) Patent No.: US 7,737,833 B2
(45) Date of Patent: Jun. 15, 2010

(54) PEDESTRIAN COLLISION DETECTION APPARATUS AND PEDESTRIAN PROTECTION SYSTEM

(75) Inventor: Tetsuya Takafuji, Anjo (JP)

(73) Assignee: DENSO Corporation, Kariya (JP)

(*) Notice: Subject to any disclaimer, the term of this patent is extended or adjusted under 35 U.S.C. 154(b) by 434 days.

(21) Appl. No.: 11/998,110

(22) Filed: Nov. 28, 2007

(65) Prior Publication Data

US 2008/0136613 A1    Jun. 12, 2008

(30) Foreign Application Priority Data

Dec. 11, 2006   (JP)   ............... 2006-333562

(51) Int. Cl.
*B60Q 1/00* (2006.01)
(52) U.S. Cl. ............... 340/436; 340/435; 701/45; 280/728.1; 180/274
(58) Field of Classification Search ........... 340/435, 340/436, 425.5, 903; 701/1, 45; 280/728.1, 280/734, 735; 180/170, 274, 271
See application file for complete search history.

(56) References Cited

U.S. PATENT DOCUMENTS

| | | | |
|---|---|---|---|
| 7,024,293 B2* | 4/2006 | Ishizaki et al. | ............... 701/45 |
| 7,304,566 B2* | 12/2007 | Mae et al. | ............... 340/436 |
| 2002/0180596 A1 | 12/2002 | Mattes et al. | |
| 2005/0096816 A1 | 5/2005 | Takafuji et al. | |
| 2005/0182540 A1* | 8/2005 | Sugiura et al. | ............... 701/41 |
| 2005/0200139 A1 | 9/2005 | Suzuki | |
| 2006/0064220 A1* | 3/2006 | Murakami et al. | ............... 701/45 |
| 2006/0103514 A1 | 5/2006 | Hosokawa | |
| 2007/0100526 A1 | 5/2007 | Heimerl et al. | |
| 2007/0222236 A1 | 9/2007 | Takahashi et al. | |

FOREIGN PATENT DOCUMENTS

| | | |
|---|---|---|
| DE | 10 2005 020146 | 6/2006 |
| EP | 1 487 677 | 10/2003 |
| EP | 1 710 598 | 10/2006 |
| JP | 10-226211 | 8/1998 |
| JP | 2005-053425 | 3/2005 |
| JP | 2005-263038 | 9/2005 |
| JP | 2006-290292 | 10/2006 |
| JP | 2007-62656 | 3/2007 |

OTHER PUBLICATIONS

Office Action dated Jul. 7, 2008 in German Application No. 10 2007 057 727.5 with English translation.

* cited by examiner

*Primary Examiner*—Anh V La
(74) *Attorney, Agent, or Firm*—Harness, Dickey & Pierce, PLC

(57) ABSTRACT

A pedestrian collision detection apparatus includes a bumper sensor, an acceleration sensor, a vehicle speed sensor, and a controller. The controller calculates an effective mass based on outputs from the bumper sensor and the speed sensor. The controller calculates a velocity change based on an output from the acceleration sensor. Further, the controller includes a two-dimensional map, which contains an effective mass and a velocity change and defines a pedestrian area for collision with a pedestrian. The controller determines a collision with a pedestrian when the pedestrian area contains a point determined by the calculated maximum effective mass and maximum velocity change. It is therefore possible to accurately distinguish a collision between the vehicle and the pedestrian from collision with the other object to reliably detect the collision.

21 Claims, 9 Drawing Sheets

FRONT ←——→ BACK

FRONT ←——→ BACK

FRONT ←——→ BACK

FRONT ←→ BACK

PEDESTRIAN COLLISION DETECTION APPARATUS AND PEDESTRIAN PROTECTION SYSTEM

CROSS REFERENCE TO RELATED APPLICATION

This application is based on and incorporates herein by reference Japanese Patent Application No. 2006-333562 filed on Dec. 11, 2006.

FIELD OF THE INVENTION

The present invention relates to a pedestrian collision detection apparatus for detecting collision between a vehicle and a pedestrian and further relates to a pedestrian protection system using the pedestrian collision detection apparatus.

BACKGROUND OF THE INVENTION

For example, Patent document 1 discloses a collision object discriminating apparatus as a conventional pedestrian collision detection apparatus for detecting collision between a vehicle and a pedestrian.

The collision object discriminating apparatus includes an optical fiber sensor, two acceleration sensors, and a collision object discriminating ECU. The optical fiber sensor is provided for a front bumper. The acceleration sensors are provided on the tops of left and right front side members. The collision object discriminating ECU compares a detection result from the optical fiber sensor with an optical fiber sensor threshold Mth. The collision object discriminating ECU also compares a detection result from the acceleration sensor with an acceleration sensor threshold Gth2. The collision object is determined to be a pedestrian when (i) the detection result from the optical fiber sensor is greater than or equal to the optical fiber sensor threshold Mth and (ii) the detection result from the acceleration sensor is smaller than the acceleration sensor threshold Gth2.

Patent Document 1: JP-2006-142876 A (corresponding to US2006/0103514)

When the collision object is determined to be a pedestrian, there is a specific correlation between a detection result from the optical fiber sensor and a detection result from the acceleration sensor. The above-mentioned collision object discriminating apparatus compares detection results from the optical fiber sensor and the acceleration sensor with independent thresholds to determine whether or not the collision object is a pedestrian. This cannot fully use the correlation between a detection result from the optical fiber sensor and the detection result from the acceleration sensor. The collision object may be determined to be a pedestrian contrary to fact. Inversely, the collision object may not be determined to be a pedestrian contrary to fact. It has been difficult to improve the accuracy for determining a pedestrian.

SUMMARY OF THE INVENTION

The present invention has been made in consideration of the foregoing. It is therefore an object of the present invention to provide a pedestrian collision detection apparatus capable of accurately distinguishing a collision between a vehicle and a pedestrian from a collision between the vehicle and another object and reliably detecting the collision.

As a first example of the present invention, a pedestrian collision detection apparatus for a vehicle is provided as follows. The apparatus includes a bumper sensor, an acceleration sensor, and a pedestrian collision determination unit. The bumper sensor is configured to detect a deformation of a bumper of the vehicle, a load applied to the bumper, or a pressure applied to the bumper. The acceleration sensor is configured to detect an acceleration of the vehicle. The pedestrian collision determination unit is configured to include a two-dimensional map for defining a correlation between a first parameter and a second parameter when colliding with a pedestrian. The first parameter is equivalent to a deformation of the bumper calculated based on an output from the bumper sensor, while the second parameter is equivalent to an impact applied to the vehicle calculated based on an output from the acceleration sensor. The pedestrian collision determination unit is further configured to determine a collision with a pedestrian when a specified area of the two-dimensional map contains a point determined by a calculated maximum value for the first parameter and a calculated maximum value for the second parameter.

As a second example of the present invention, a pedestrian collision detection apparatus for a vehicle is provided as follows. The apparatus includes a bumper sensor, a speed sensor, an acceleration sensor, and a pedestrian collision determination unit. The bumper sensor is configured to detect a load or a pressure applied to a bumper of the vehicle. The speed sensor is configured to detect a speed of the vehicle. The acceleration sensor is configured to detect an acceleration of the vehicle. The pedestrian collision determination unit is configured to include a two-dimensional map for defining a correlation between a first parameter and a second parameter when colliding with a pedestrian. The first parameter is equivalent to a deformation of the bumper calculated based on outputs from the bumper sensor and the vehicle speed sensor, while the second parameter is equivalent to an impact applied to the vehicle calculated based on an output from the acceleration sensor. The pedestrian collision determination unit is further configured to determine a collision with a pedestrian when a specified area of the two-dimensional map contains a point determined by a calculated maximum value for the first parameter and a calculated maximum value for the second parameter.

As yet another example of the present invention, a pedestrian protection system is provided to include (i) the pedestrian collision detection apparatus according to the above first or second example and (ii) a pedestrian protection apparatus for protecting a colliding pedestrian.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

The invention will be described in more detail with reference to embodiments. The embodiments apply a pedestrian collision detection apparatus of the invention to an air bag apparatus for protecting a pedestrian who collides with a bumper.

First Embodiment

Figure 1:
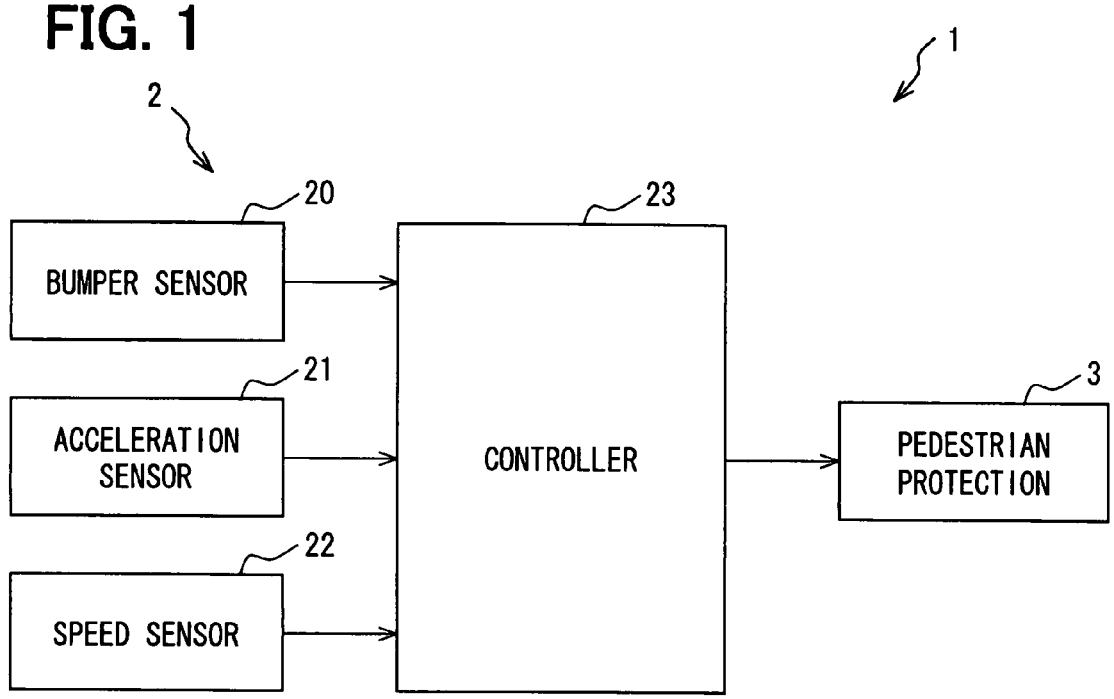
FIG. 1 is a block diagram of an air bag apparatus according to a first embodiment.
Figure 2:
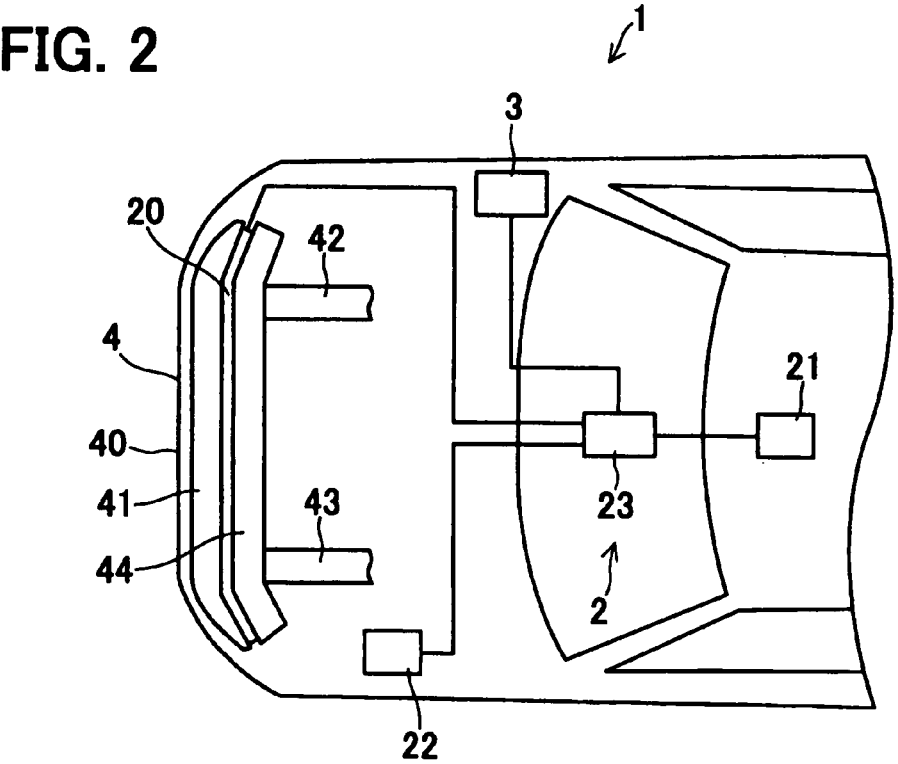
FIG. 2 shows a schematic arrangement of the air bag apparatus.

Referring now to FIGS. 1 and 2, a configuration of an air bag apparatus according to a first embodiment will be described. FIG. 1 is a block diagram of the air bag apparatus for a subject vehicle. FIG. 2 is a schematic arrangement of the air bag apparatus.

As shown in FIGS. 1 and 2, an air bag apparatus 1 protects a pedestrian who collides with a bumper 4 of the vehicle. The air bag apparatus 1 includes a pedestrian collision detection apparatus 2 and a pedestrian protection apparatus 3.

The pedestrian collision detection apparatus 2 detects an impact applied to the pedestrian from the bumper 4. The pedestrian collision detection apparatus 2 includes a bumper sensor 20, an acceleration sensor 21, a vehicle speed sensor 22, and a controller 23 (functioning as a pedestrian collision determination means or unit).

The bumper sensor 20 detects a load applied to the bumper 4. More specifically, the bumper sensor 20 is an optical fiber sensor that varies the amount of light in accordance with an applied load. The bumper 4 includes a bumper cover 40 and a bumper absorber 41. A bumper reinforcement 44 is used for mounting the bumper 4 and is fixed to front ends of side members 42 and 43 included in a vehicle frame. The bumper cover 40 is fixed to the bumper reinforcement 44 via the bumper absorber 41. The bumper sensor 20 is provided between the bumper absorber 41 and the bumper reinforcement 44 and is connected to the controller 23.

The acceleration sensor 21 detects a vehicle acceleration, or more particularly, a forward or backward deceleration. The acceleration sensor 21 is positioned at the center of the vehicle. The acceleration sensor 21 is provided on a vehicle frame hard enough not to be deformed by collision with a pedestrian and is connected to the controller 23.

The vehicle speed sensor 22 detects a vehicle speed. The vehicle speed sensor 22 is provided near a front tire and is connected to the controller 23.

The controller 23 includes a microcomputer and determines whether or not an object colliding with the vehicle is a pedestrian based on outputs (e.g., with 1 ms intervals) from the bumper sensor 20, the acceleration sensor 21, and the vehicle speed sensor 22. When the colliding object is determined to be a pedestrian, the controller outputs a start signal for starting the pedestrian protection apparatus 3. The controller 23 is provided at the center of the vehicle.

The pedestrian protection apparatus 3 expands frontward of a front window and protects a pedestrian colliding with the bumper 4. The pedestrian protection apparatus 3 is provided around a front pillar and is connected to the controller 23.

Figure 3:
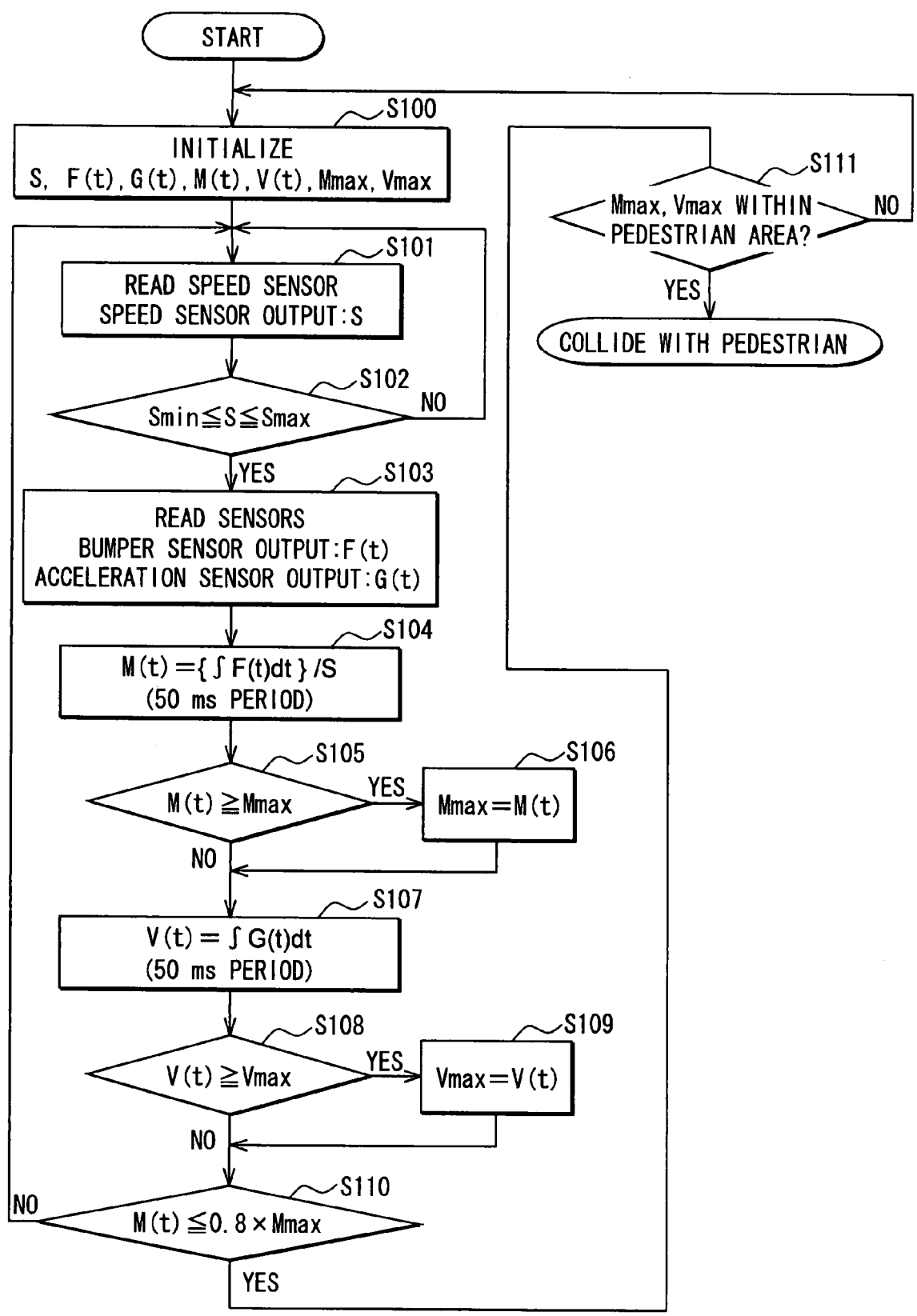
FIG. 3 is a flowchart showing an operation of a pedestrian collision detection apparatus.
Figure 4:
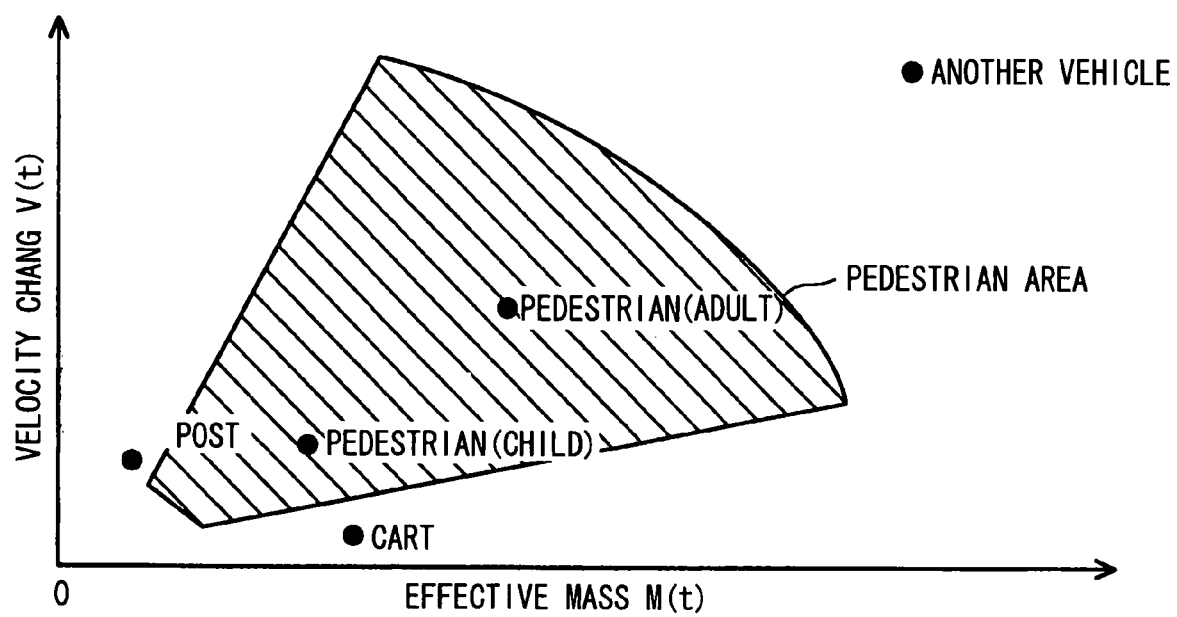
FIG. 4 is a two-dimensional map between an effective mass and a velocity change.

An operation of the air bag apparatus will be described with reference to FIGS. 1 through 4. FIG. 3 is a flowchart showing the operation of the pedestrian collision detection apparatus. FIG. 4 is a two-dimensional map between an effective mass and a velocity change.

When the air bag apparatus 1 is powered in FIGS. 1 and 2, the pedestrian collision detection apparatus 2 and the pedestrian protection apparatus 3 start operating.

As shown in FIG. 3, the controller 23 initializes internally defined variables (Step S100). Specifically, the controller 23 initializes vehicle speed sensor output S, bumper sensor output F(t), acceleration sensor output G(t), effective mass M(t) (first parameter), velocity change V(t) (second parameter), maximum effective mass Mmax, and minimum velocity change Vmax.

The controller 23 then reads an output from the vehicle speed sensor 22 and assigns the output to the vehicle speed sensor output S (Step S101). The controller 23 determines whether or not the settled vehicle speed sensor output S is greater than or equal to predetermined minimum pedestrian determination speed Smin and is smaller than or equal to maximum pedestrian determination speed Smax (Step S102). The minimum pedestrian determination speed Smin and the maximum pedestrian determination speed Smax specify a range of vehicle speeds for determining collision with a pedestrian. When the vehicle collides with a pedestrian at a low speed, a small impact is applied to the pedestrian. In such case, there is little need for starting the pedestrian protection apparatus 3; starting the pedestrian protection apparatus 3 may adversely affect vehicle operations. When the vehicle collides with the pedestrian at a high speed, the pedestrian may be hit seriously. The pedestrian protection apparatus 3 cannot protect the pedestrian. In consideration for this, the minimum pedestrian determination speed Smin is set to a minimum vehicle speed for starting the pedestrian protection apparatus 3. The maximum pedestrian determination speed Smax is set to a maximum vehicle speed for starting the pedestrian protection apparatus 3.

When the vehicle speed sensor output S is smaller than the minimum pedestrian determination speed Smin or exceeds the maximum pedestrian determination speed Smax at Step S102, the controller 23 returns to Step S101. When the vehicle speed sensor output S is greater than or equal to the minimum pedestrian determination speed Smin and is smaller than or equal to the maximum pedestrian determination speed Smax at Step S102, the controller 23 reads outputs from the bumper sensor 20 and the acceleration sensor 21 and assigns the outputs to bumper sensor output F(t) and acceleration sensor output G(t) (Step S103).

The controller 23 then calculates an effective mass according to Equation 1 using the bumper sensor output F(t) and the vehicle speed sensor output S and assigns the result to the effective mass M(t) (Step S104). The effective mass is equivalent to deformation of the bumper 4.

$$M(t) = \frac{\int F(t)dt}{S} \qquad <\text{Equation 1}>$$

The effective mass is equivalent to a mass of an object colliding with the bumper 4 and is proportional to deformation of the bumper 4. An impulse of the colliding object is equal to a change in the momentum. As expressed in Equation 1, the effective mass M(t) can be calculated based on the vehicle speed sensor output S and the bumper sensor output F(t) as time integration, or more specifically, an integration value integrated for a 50 ms period from a present time point to the past (e.g., the most recent 50 outputs). The controller 23 determines whether or not the settled effective mass M(t) is greater than or equal to the maximum effective mass Mmax (Step S105).

When the effective mass M(t) is greater than or equal to the maximum effective mass Mmax at Step S105, the controller 23 assigns the value of the effective mass M(t) to the maximum effective mass Mmax for update (Step S106).

When the effective mass M(t) is smaller than the maximum effective mass Mmax at Step S105 or when the maximum effective mass Mmax is updated at Step S106, the controller 23 calculates a velocity change according to Equation 2 using acceleration sensor output G(t) and assigns the result to the velocity change V(t) (Step S107). The velocity change is equivalent to an impact applied to the vehicle.

$$V(t) = \int G(t)dt \qquad \text{<Equation 2>}$$

The velocity change concerns the vehicle collision and is proportional to an impact applied to the vehicle. As expressed in Equation 2, the velocity change V(t) can be calculated based on the acceleration sensor output G(t) as time integration, or more specifically, an integration value integrated for a 50 ms period from a present time point to the past. The controller 23 determines whether or not the settled velocity change V(t) is greater than or equal to maximum velocity change Vmax (Step S108).

When the velocity change V(t) is greater than or equal to the maximum velocity change Vmax at Step S108, the controller 23 assigns the value of the velocity change V(t) to the maximum velocity change Vmax for update (Step S106). When the velocity change V(t) is smaller than Vmax at Step S108 or when the maximum velocity change Vmax is updated at Step S109, the controller 23 determines whether or not the settled effective mass M(t) is smaller than or equal to 80% of the maximum effective mass Mmax (Step S110).

When the effective mass M(t) exceeds 80% of the maximum effective mass Mmax at Step S110, the controller 23 returns to Step S101. When the effective mass M(t) is smaller than or equal to 80% of the maximum effective mass Mmax at Step S110, the controller 23 determines whether or not a point determined by the maximum effective mass Mmax and the maximum velocity change Vmax is within a pedestrian area (specified area) predetermined on a two-dimensional map of effective mass and velocity change (Step S111). As shown in FIG. 4, the two-dimensional map shows the relationship between the effective mass M(t) and the velocity change V(t). The map defines an approximately sectorial pedestrian area indicative of correlation between the effective mass M(t) and the velocity change V(t) when the vehicle collides with a pedestrian. The two-dimensional map is prestored in the controller 23.

When the point determined by the maximum effective mass Mmax and the maximum velocity change Vmax is inside the pedestrian area at Step S111, the controller 23 determines that the vehicle collides with a pedestrian. The controller 23 outputs a start signal for starting the pedestrian protection apparatus 3. The pedestrian protection apparatus 3 expands to protect the colliding pedestrian. When the point determined by the maximum effective mass Mmax and the maximum velocity change Vmax is outside the pedestrian area at Step S111, the controller 23 determines that the colliding object is not a pedestrian. The controller 23 returns to Step S100 without outputting the start signal and repeats the same operation.

The following effect is expected. The pedestrian collision detection apparatus 2 can accurately distinguish collision between the vehicle and a pedestrian from collision with the other object(s) and reliably detect the collision. When the bumper 4 collides with an object, the bumper 4 is deformed and applies an impact to the vehicle. Deformation of the bumper 4 and an impact applied to the vehicle depend on an object to be collided with and are correlated with each other. The effective mass is equivalent to a mass of an object colliding with the bumper 4 and is proportional to the deformation of the bumper 4. A velocity change in the colliding vehicle is proportional to an impact applied to the vehicle. The effective mass and the velocity change are similarly correlated with each other. As shown in FIG. 4, colliding with a low safety post (or post cone) decreases the maximum effective mass but instead increases the maximum velocity change. Colliding with a tall shopping cart increases the maximum effective mass but instead decreases the maximum velocity change. Colliding with another vehicle greatly increases the maximum effective mass and the maximum velocity change. By contrast, colliding with a pedestrian causes the maximum effective mass to be greater than that for collision with the safety post and to be smaller than that for collision with the vehicle. The maximum velocity change is greater than that for collision with the shopping cart and is smaller than that for collision with the vehicle. Increasing the age of the pedestrian from a child to an adult also increases the maximum effective mass and the maximum velocity change.

On the two-dimensional map of effective mass and velocity change, the pedestrian area obviously differs from the other area. The pedestrian area contains points determined by maximum values resulting from collision with a pedestrian. The other area contains points determined by maximum values resulting from collision with the other objects. Collision with a pedestrian can be determined by determining which area of the two-dimensional map contains a point determined by the maximum effective mass and the maximum velocity change. In addition, it is possible to fully use the correlation between the effective mass and the velocity change and improve the determination accuracy compared to the prior art.

The pedestrian collision detection apparatus 2 can use (i) an integration value of loads applied to the bumper 4 and (ii) a vehicle speed to thereby reliably calculate the effective mass. The pedestrian collision detection apparatus 2 can more accurately calculate the effective mass in consideration for a vehicle speed. Further, the pedestrian collision detection apparatus 2 can reliably calculate a velocity change using an integration value for accelerations applied to the vehicle.

The pedestrian collision detection apparatus 2 can reliably specify the maximum effective mass by confirming that the effective mass becomes maximum and thereafter becomes smaller than or equal to 80% of the maximum. An increase or decrease of the velocity change synchronizes with an increase or decrease of the effective mass. It is possible to reliably specify a maximum velocity change. This makes it possible to eliminate an incorrect determination due to a value other than the maximum value.

In addition, the pedestrian collision detection apparatus 2 determines collision with a pedestrian and outputs the start signal for starting the pedestrian protection apparatus 3 so as to be able to protect the pedestrian colliding with the vehicle. Within a specified range of vehicle speeds, the pedestrian collision detection apparatus 2 can determine collision with a pedestrian, appropriately start the pedestrian protection apparatus, and reliably protect the pedestrian.

In the above-mentioned example, the pedestrian collision detection apparatus 2 calculates the effective mass based on an integration value of loads applied to the bumper 4 and a vehicle speed; however, a modification can be allowed without limiting to the foregoing configuration. Despite the degraded accuracy, only the integration value of loads can be used to calculate the effective mass. The load itself can be used instead of the effective mass. In this case, the two-dimensional map of effective mass and velocity change only needs to be changed to a two-dimensional map of load and velocity change.

In the above-mentioned example, the pedestrian collision detection apparatus 2 specifies the maximum effective mass and the maximum velocity change by confirming that the effective mass becomes maximum and thereafter becomes smaller than or equal to 80% of the maximum; however, a modification can be allowed without limiting to the foregoing configuration. It may be preferable to specify the maximum effective mass and the maximum velocity change by confirming that the effective mass becomes maximum and decreases after a lapse of specified time. The confirmation may be based on the velocity change or on the effective mass and the velocity change. That is, the confirmation may be based on at least one of parameters equivalent to the deformation of the bumper 4 and an impact applied to the vehicle.

Figure 13:
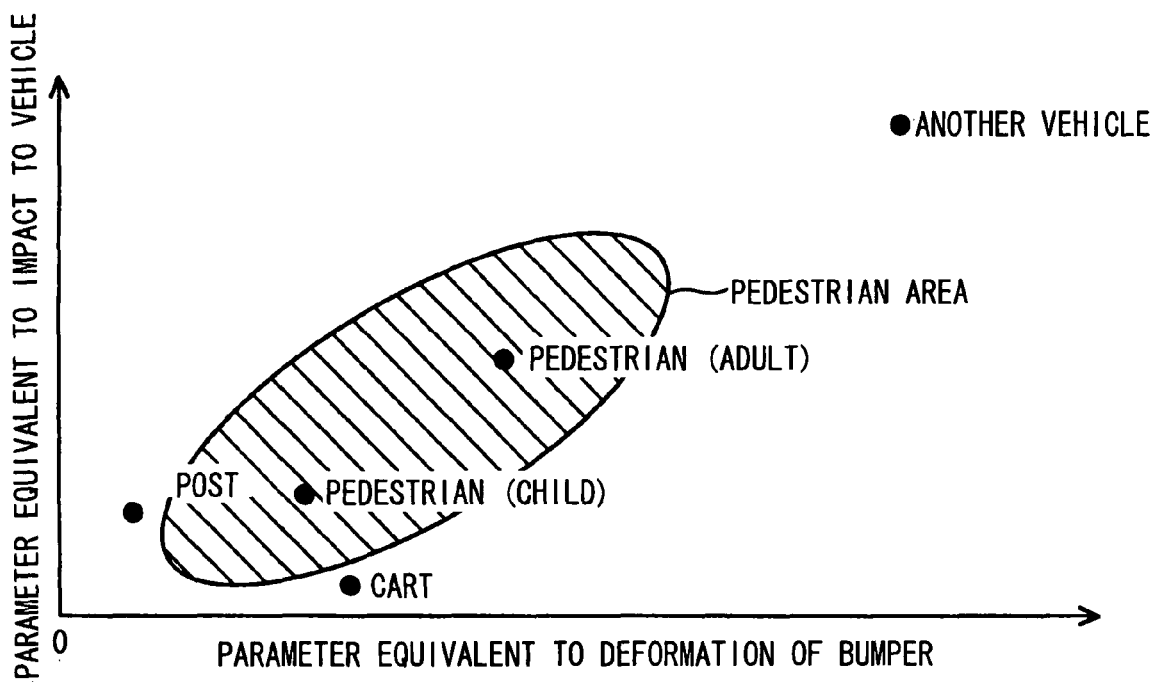
FIG. 13 is a two-dimensional map showing another shape of a pedestrian area.

In the above-mentioned example, the pedestrian collision detection apparatus 2 uses the approximately sectorial pedestrian area on the two-dimensional map; however, a modification can be allowed without limiting to the foregoing configuration. As shown in FIG. 13, for example, the pedestrian area may be oval. The pedestrian area may be shaped so as to be able to specify the correlation between parameters equivalent to the deformation of the bumper 4 and an impact applied to the vehicle.

Figure 5:
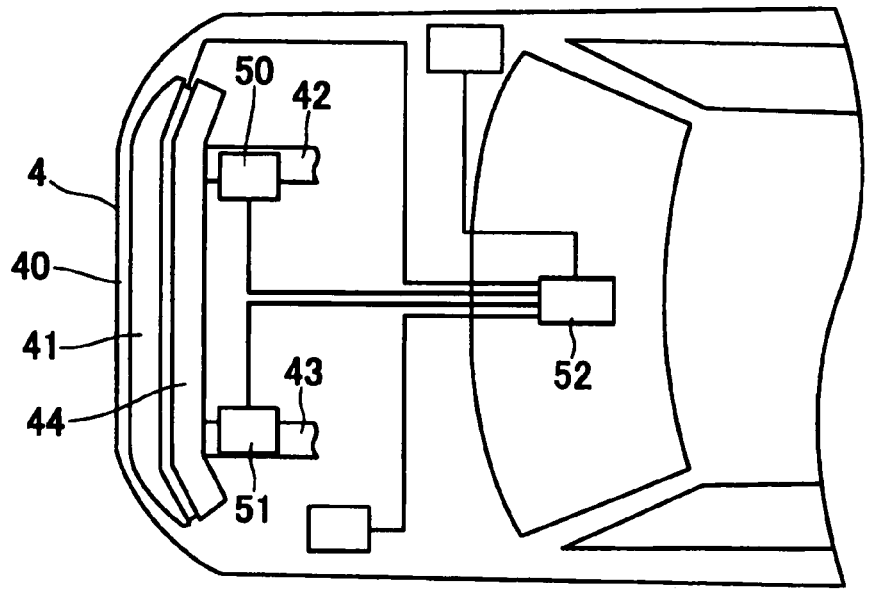
FIG. 5 shows another schematic arrangement of an acceleration sensor.

In the above-mentioned example, the pedestrian collision detection apparatus 2 is provided with the one acceleration sensor 21 on the frame at the vehicle center; however, a modification can be allowed without limiting to the foregoing configuration. As shown in FIG. 5, for example, the acceleration sensor 21 may be provided on the side members 42 and 43. The side members 42 and 43 are included in the vehicle frame and are hard enough not to be deformed by collision with a pedestrian. The similar configuration can be used. Further, two acceleration sensors 50 and 51 may be used. In this case, a controller 52 can use a larger value or an average from both sensors as the acceleration sensor output G(t). The similar configuration can be used.

Second Embodiment

The air bag apparatus according to a second embodiment will be described. The air bag apparatus according to the second embodiment replaces the bumper sensor of the air bag apparatus according to the first embodiment with a pressure sensor for detecting a pressure.

Figure 6:
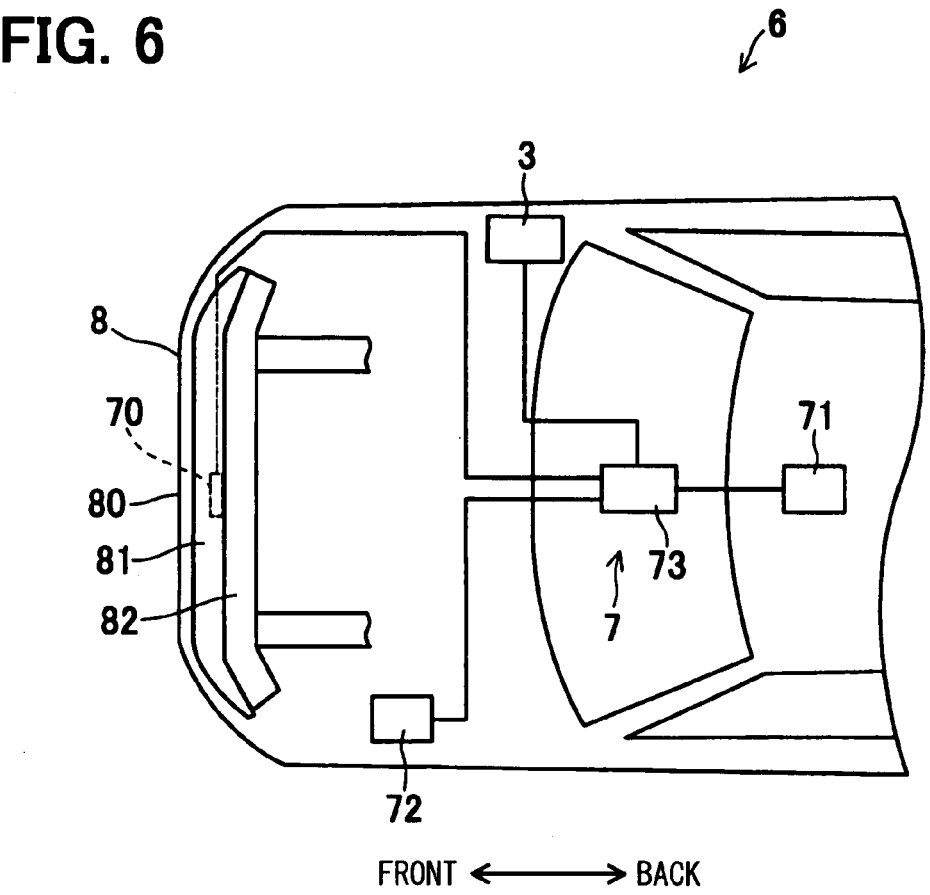
FIG. 6 shows a schematic arrangement of an air bag apparatus according to a second embodiment.
Figure 7:
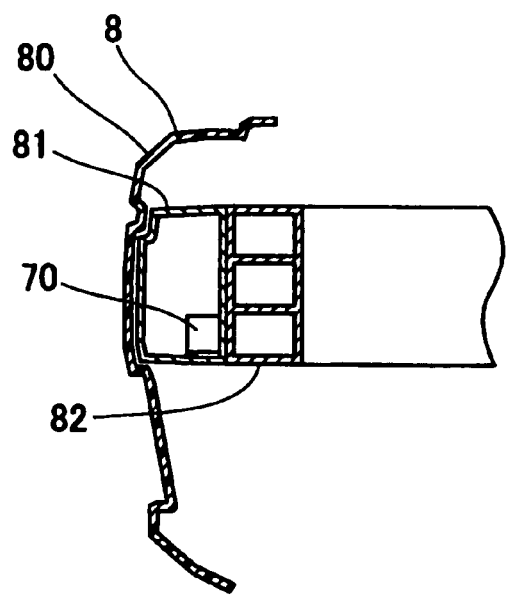
FIG. 7 is a sectional view around a bumper.

The configuration of the air bag apparatus will be described with reference to FIGS. 6 and 7. FIG. 6 shows a schematic arrangement of the air bag apparatus. FIG. 7 shows a sectional view around the bumper. The following describes only the bumper sensor configuration that differs from the air bag apparatus according to the first embodiment. A description is omitted for the common parts unless needed. The mutually corresponding parts in two embodiments are designated by the same reference numerals.

As shown in FIG. 6, an air bag apparatus 6 includes a pedestrian collision detection apparatus 7 and the pedestrian protection apparatus 3. The pedestrian collision detection apparatus 7 includes a bumper sensor 70, an acceleration sensor 71, a vehicle speed sensor 72, and a controller 73 (functioning as a pedestrian collision determination means or unit).

The bumper sensor 70 is a pressure sensor that detects a pressure applied to the bumper 8. As shown in FIGS. 6 and 7, the bumper 8 includes a bumper cover 80 and a bumper absorber 81 resembling a rectangular cylinder. The bumper cover 80 is fixed to a bumper reinforcement 82 via the bumper absorber 81. The bumper sensor 70 is provided on an inside peripheral surface of the bumper absorber 81 toward the bumper reinforcement 82 and is connected to the controller 73.

The acceleration sensor 71 and the vehicle speed sensor 72 are equal to the acceleration sensor 21 and the vehicle speed sensor 22 according to the first embodiment and a description is omitted.

Figure 8:
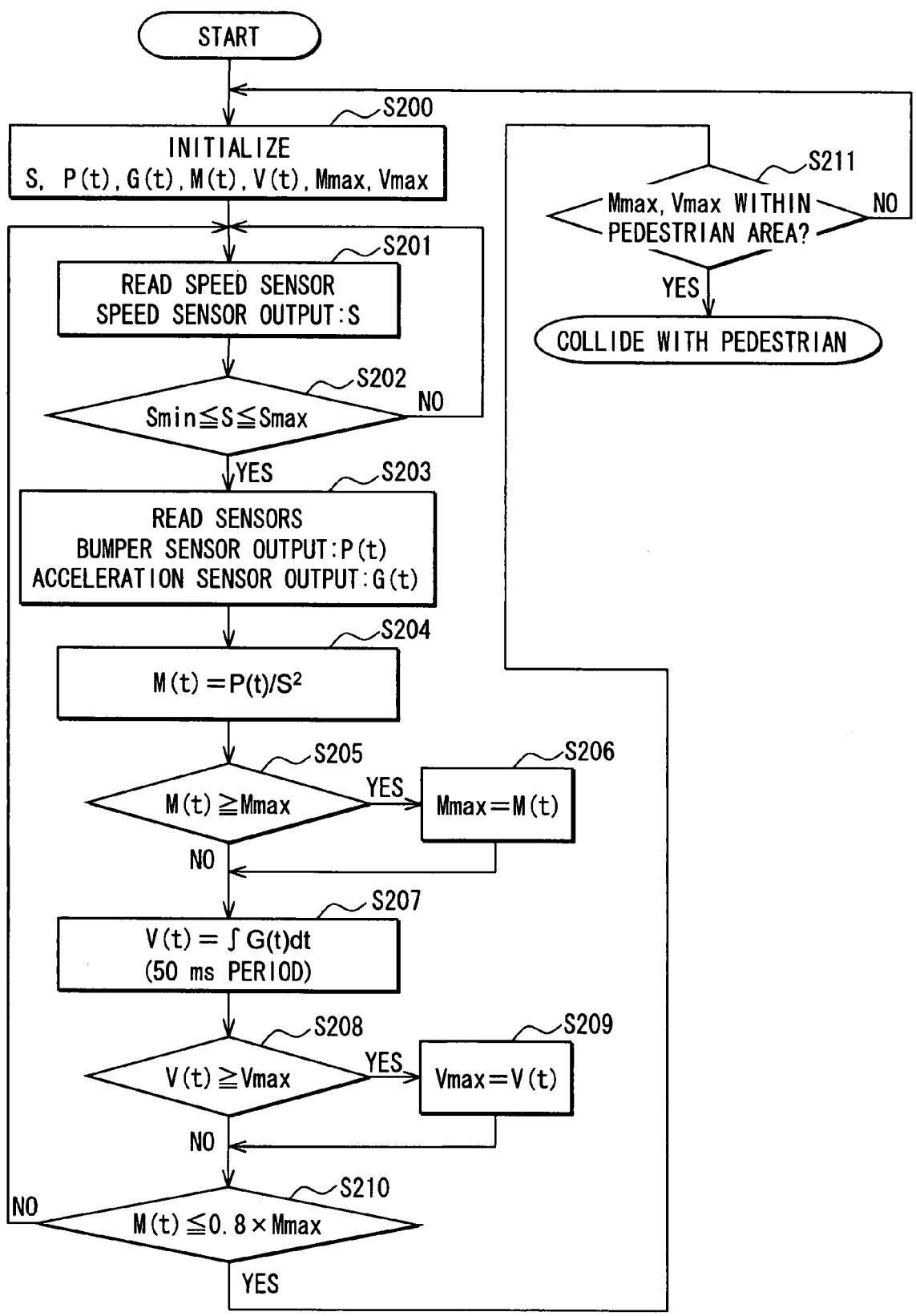
FIG. 8 is a flowchart showing an operation of a pedestrian collision detection apparatus.

Operations will be described with reference to FIGS. 6 and 8. FIG. 8 is a flowchart showing operations of the pedestrian collision detection apparatus 7. The following describes only initialization, sensor output reading, and effective mass calculation that differ from the air bag apparatus according to the first embodiment. A description is omitted for the common parts unless needed.

When the air bag apparatus 6 is powered in FIG. 6, the pedestrian collision detection apparatus 7 and the pedestrian protection apparatus 3 start operating.

As shown in FIG. 8, the controller 73 initializes internally defined vehicle speed sensor output S, bumper sensor output P(t), acceleration sensor output G(t), effective mass M(t) (first parameter), velocity change V(t) (second parameter), maximum effective mass Mmax, and maximum velocity change Vmax (Step S200).

The controller 73 then reads an output from the vehicle speed sensor 72 and assigns the output to the vehicle speed sensor output S (Step S201). The controller 73 determines whether or not the settled vehicle speed sensor output S is greater than or equal to minimum pedestrian determination speed Smin and is smaller than or equal to maximum pedestrian determination speed Smax (Step S202).

When the vehicle speed sensor output S is smaller than the minimum pedestrian determination speed Smin or exceeds the maximum pedestrian determination speed Smax at Step S202, the controller 73 returns to Step S201. When the vehicle speed sensor output S is greater than or equal to the minimum pedestrian determination speed Smin and is smaller than or equal to the maximum pedestrian determination speed Smax at Step S202, the controller 73 reads outputs from the bumper sensor 70 and the acceleration sensor 71 and assigns the outputs to the bumper sensor output P(t) and the acceleration sensor output G(t) (Step S203).

The controller 73 then calculates an effective mass according to Equation 3 using the bumper sensor output P(t) and the vehicle speed sensor output S and assigns the result to the effective mass M(t) (Step S204). The effective mass is equivalent to deformation of the bumper 8.

$$M(t) = \frac{P(t)}{S^2} \qquad < \text{Equation 3} >$$

The bumper sensor 70 detects a pressure. Accordingly, the bumper sensor 70 outputs a value equivalent to the deformation quantity of the bumper 8. Viewed from the vehicle, a pedestrian's foot moves at collision speed S. The bumper deforms in proportion to a kinetic energy resulting from the pedestrian's foot. The kinetic energy is found by multiplying the mass of the pedestrian's foot by the speed squared. The deformation quantity is expressed as a pressure change. Therefore, the effective mass M(t) can be calculated based on the bumper sensor output P(t) and the vehicle speed sensor output S without time integration. Equation 3 is simplified with a constant omitted and can provide one-to-one correspondence to a mass. Equation 3 has no effect on the performance of determining a colliding object by taking into account the mass for a determination threshold. In addition to Equation 3, it may be preferable to prestore a correspondence table for selecting a mass from the vehicle speed and the deformation quantity to find the mass. Step S205 and later are the same as Step S105 and later in the first embodiment and a description is omitted.

The following effect is expected. The pedestrian collision detection apparatus 7 can reliably calculate the effective mass using a pressure applied to the bumper 4 and a vehicle speed. The pedestrian collision detection apparatus 7 can more accurately calculate the effective mass in consideration for a vehicle acceleration. Similarly to the first embodiment, the pedestrian collision detection apparatus 7 can accurately distinguish collision between the vehicle and a pedestrian from collision with the other objects and reliably detect the collision.

In the above-mentioned example, the pedestrian collision detection apparatus 7 calculates the effective mass based on a pressure applied to the bumper 4 and a vehicle speed; however, a modification can be allowed without limiting to the foregoing configuration. Despite the degraded accuracy, only the pressure can be used to calculate the effective mass. The pressure itself can be used instead of the effective mass. In this case, the two-dimensional map of effective mass and velocity change only needs to be changed to a two-dimensional map of pressure and velocity change.

Third Embodiment

The air bag apparatus according to a third embodiment will be described. The air bag apparatus according to the third embodiment replaces the bumper sensor of the air bag apparatus according to the first embodiment with a distance sensor for detecting a bumper's deformation quantity.

Figure 9:
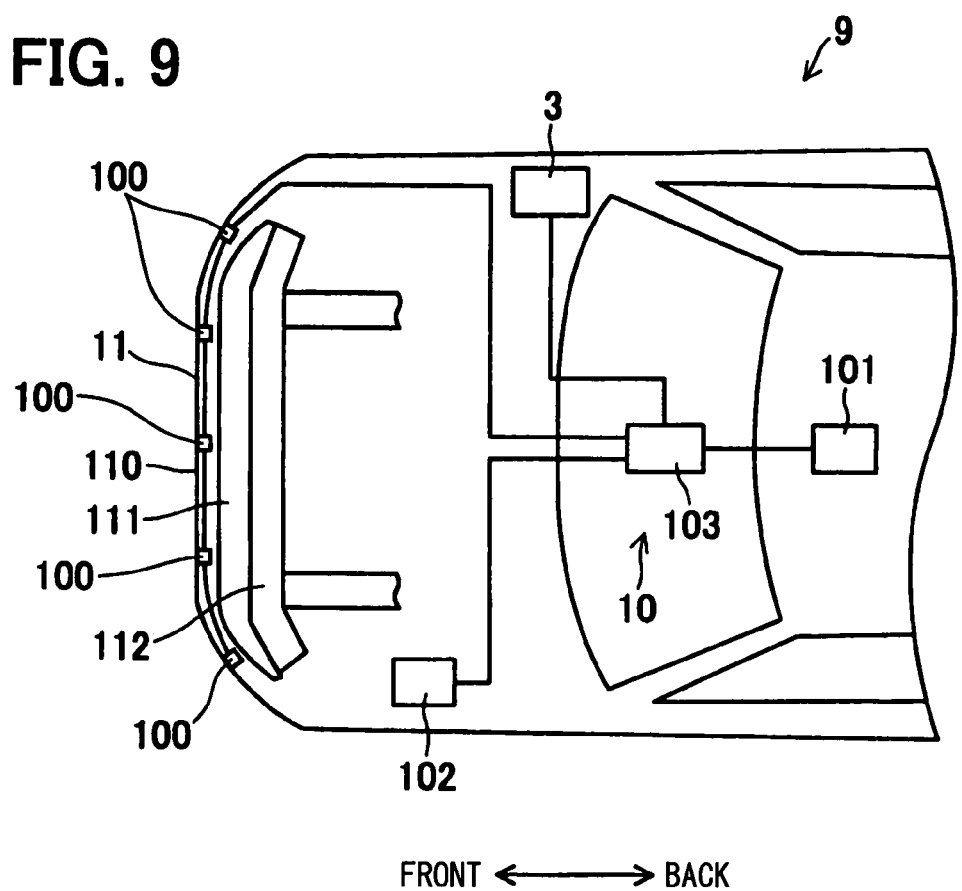
FIG. 9 shows a schematic arrangement of an air bag apparatus according to a third embodiment.
Figure 10:
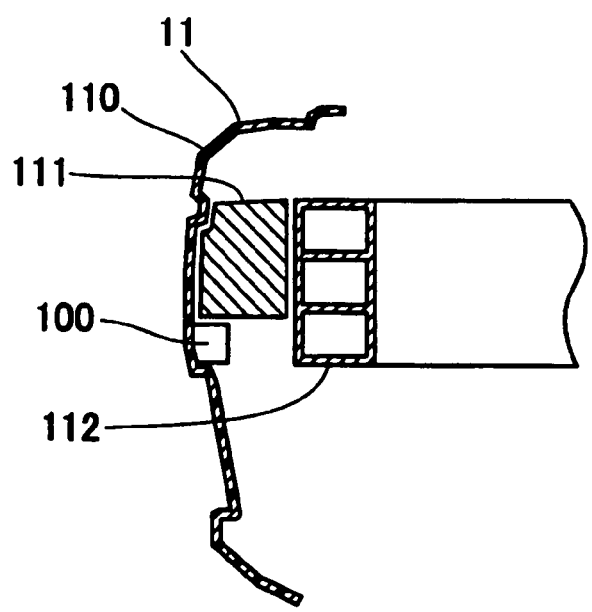
FIG. 10 is a sectional view around a bumper.

The configuration of the air bag apparatus will be described with reference to FIGS. 9 and 10. FIG. 9 shows a schematic arrangement of the air bag apparatus. FIG. 10 shows a sectional view around the bumper. The following describes only the bumper sensor configuration that differs from the air bag apparatus according to the first embodiment. A description is omitted for the common parts unless needed. The mutually corresponding parts in two embodiments are designated by the same reference numerals.

As shown in FIG. 9, an air bag apparatus 9 includes a pedestrian collision detection apparatus 10 and the pedestrian protection apparatus 3. The pedestrian collision detection apparatus 10 includes multiple bumper sensors 100, an acceleration sensor 101, a vehicle speed sensor 102, and a controller 103 (functioning as a pedestrian collision determination means or unit).

The bumper sensor 100 is a distance sensor for detecting a deformation quantity of the bumper 11. As shown in FIGS. 9 and 10, the bumper 11 includes a bumper cover 110 and a bumper absorber 111. The bumper cover 110 is fixed to a bumper reinforcement 112 via the bumper absorber 111. The bumper sensor 100 is provided on the rear surface of the bumper absorber 111 opposite the bumper reinforcement 112 and is connected to the controller 103. The bumper sensor 100 detects a distance to the bumper reinforcement 112 and converts the distance into a deformation quantity of the bumper 11 for output.

The acceleration sensor 101 and the vehicle speed sensor 102 are equal to the acceleration sensor 21 and the vehicle speed sensor 22 according to the first embodiment and a description is omitted.

Figure 11:
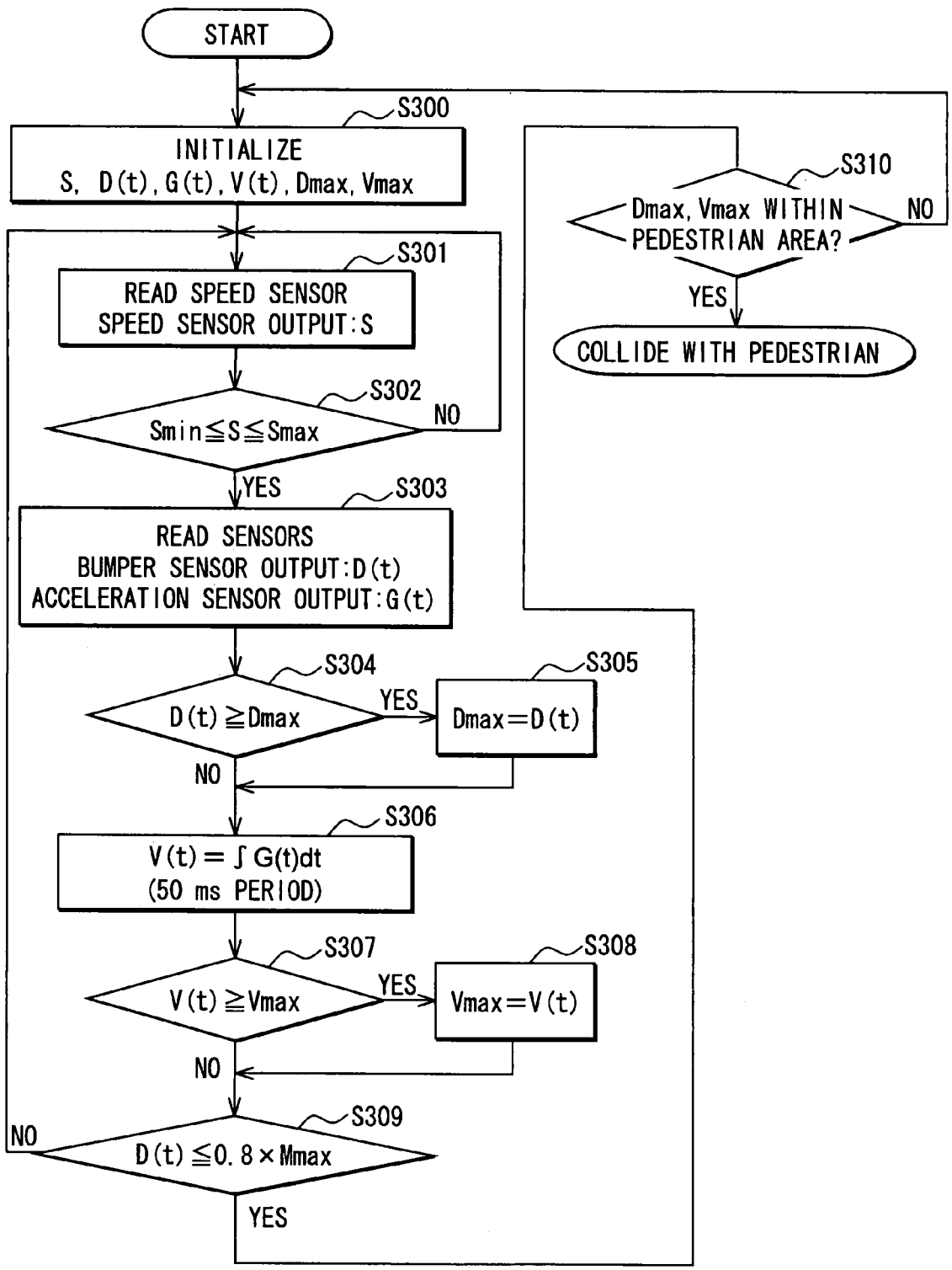
FIG. 11 is a flowchart showing an operation of an pedestrian collision detection apparatus.

Operations will be described with reference to FIGS. 9 and 11. FIG. 11 is a flowchart showing operations of the pedestrian collision detection apparatus.

When the air bag apparatus 9 is powered in FIG. 9, the pedestrian collision detection apparatus 10 and the pedestrian protection apparatus 3 start operating.

As shown in FIG. 11, the controller 103 initializes internally defined vehicle speed sensor output S, bumper sensor output D(t) (first parameter), acceleration sensor output G(t), velocity change V(t) (second parameter), maximum deformation quantity Dmax, and maximum velocity change Vmax.

The controller 103 then reads an output from the vehicle speed sensor 102 and assigns the output to the vehicle speed sensor output S (Step S301). The controller 103 determines whether or not the settled vehicle speed sensor output S is greater than or equal to minimum pedestrian determination speed Smin and is smaller than or equal to maximum pedestrian determination speed Smax (Step S302).

When the vehicle speed sensor output S is smaller than the minimum pedestrian determination speed Smin or exceeds the maximum pedestrian determination speed Smax at Step S302, the controller 103 returns to Step S301. When the vehicle speed sensor output S is greater than or equal to the minimum pedestrian determination speed Smin and is smaller than or equal to the maximum pedestrian determination speed Smax at Step S302, the controller 103 reads outputs from the bumper sensors 100 and assigns a maximum value to the bumper sensor output D(t). The controller 103 also reads an output from the acceleration sensor 101 and assigns it to the acceleration sensor output G(t) (Step S303). The controller 103 determines whether or not the settled bumper sensor output D(t) is greater than or equal to the maximum deformation quantity Dmax (Step S304).

When the deformation quantity D(t) is greater than or equal to the maximum deformation quantity Dmax at Step S304, the controller 103 assigns the value of the deformation quantity D(t) to the maximum deformation quantity Dmax for update (Step S305). When the deformation quantity D(t) is smaller than the maximum deformation quantity Dmax at Step S304 or when the maximum deformation quantity Dmax is updated at Step S305, the controller 103 calculates a velocity change using acceleration sensor output G(t) and assigns the result to the velocity change V(t) (Step S306). The velocity change is equivalent to an impact applied to the vehicle. The controller 103 determines whether or not the settled velocity change V(t) is greater than or equal to the maximum velocity change Vmax (Step S307).

When the velocity change V(t) is greater than or equal to the maximum velocity change Vmax at Step S307, the controller 103 assigns the value of the velocity change V(t) to the maximum velocity change Vmax for update (Step S308). When the velocity change V(t) is smaller than Vmax at Step S307 or when the maximum velocity change Vmax is updated at Step S308, the controller 103 determines whether or not the settled deformation quantity D(t) is smaller than 80% of the maximum deformation quantity Dmax (Step S309).

Figure 12:
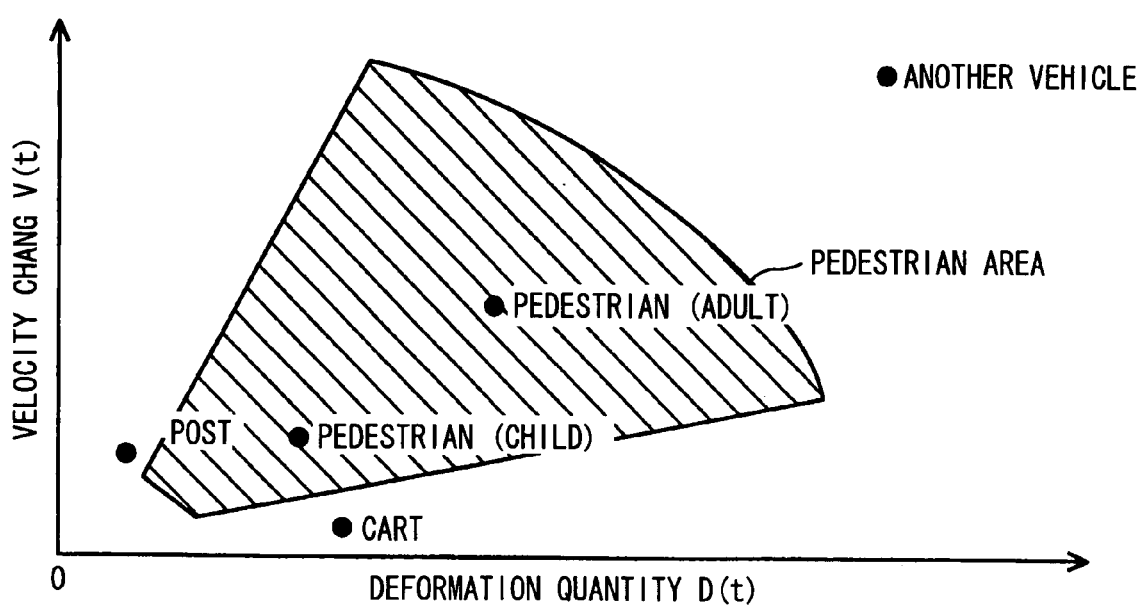
FIG. 12 is a two-dimensional map between a bumper deformation quantity and a velocity change.

When the deformation quantity D(t) is greater than or equal to 80% of the maximum deformation quantity Dmax at Step S309, the controller 103 returns to Step S301. When the deformation quantity D(t) is smaller than 80% of the maximum deformation quantity Dmax at Step S309, the controller 103 determines whether or not a point determined by the maximum deformation quantity Dmax and the maximum velocity change Vmax is within a pedestrian area (specified area) predetermined on a two-dimensional map of deformation quantity and velocity change (Step S310). As shown in FIG. 12, the two-dimensional map shows the relationship between the deformation quantity D(t) and the velocity change V(t). The map defines an approximately sectorial pedestrian area indicative of correlation between the deformation quantity D(t) and the velocity change V(t) when the vehicle collides with a pedestrian. The two-dimensional map is prestored in the controller 103.

When the point determined by the maximum deformation quantity Dmax and the maximum velocity change Vmax is inside the pedestrian area at Step S310, the controller 103 determines that the vehicle collides with a pedestrian. The controller 103 outputs a start signal for starting the pedestrian protection apparatus 3. The pedestrian protection apparatus 3 expands to protect the colliding pedestrian. When the point determined by the maximum deformation quantity Dmax and the maximum velocity change Vmax is outside the pedestrian area at Step S310, the controller 103 determines that the colliding object is not a pedestrian. The controller 103 returns to Step S300 without outputting the start signal and repeats the same operation.

The following effect is expected. The pedestrian collision detection apparatus 10 can accurately distinguish collision between the vehicle and a pedestrian from collision with the other object(s) and reliably detect the collision. Deformation of the bumper 4 and an impact applied to the vehicle depend on an object to be collided with and are correlated with each other. Obviously, a deformation quantity of the bumper 4 and a velocity change are also correlated with each other. Similarly to the first and second embodiments, the pedestrian collision detection apparatus 10 can accurately distinguish collision between the vehicle and a pedestrian from collision with the other objects and reliably detect the collision. In addition, the pedestrian collision detection apparatus 10 determines collision with a pedestrian and outputs the start signal for starting the pedestrian protection apparatus 3 so as to be able to protect the pedestrian colliding with the vehicle. Within a specified range of vehicle speeds, the pedestrian collision detection apparatus 10 can determine collision with a pedestrian, appropriately start the pedestrian protection apparatus 3, and reliably protect the pedestrian.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As a first aspect, a pedestrian collision detection apparatus for a vehicle includes a bumper sensor, an acceleration sensor, and a pedestrian collision determination unit. The bumper sensor is configured to detect a deformation of a bumper of the vehicle, a load applied to the bumper, or a pressure applied to the bumper. The acceleration sensor is configured to detect an acceleration of the vehicle. The pedestrian collision determination unit is configured to include a two-dimensional map for defining a correlation between a first parameter and a second parameter when colliding with a pedestrian. The first parameter is equivalent to a deformation of the bumper calculated based on an output from the bumper sensor, while the second parameter is equivalent to an impact applied to the vehicle calculated based on an output from the acceleration sensor. The pedestrian collision determination unit is further configured to determine a collision with a pedestrian when a specified area of the two-dimensional map contains a point determined by a calculated maximum value for the first parameter and a calculated maximum value for the second parameter.

This configuration can accurately distinguish collision between a vehicle and a pedestrian from collision with the other object(s) and reliably detect the collision.

Figure 14:
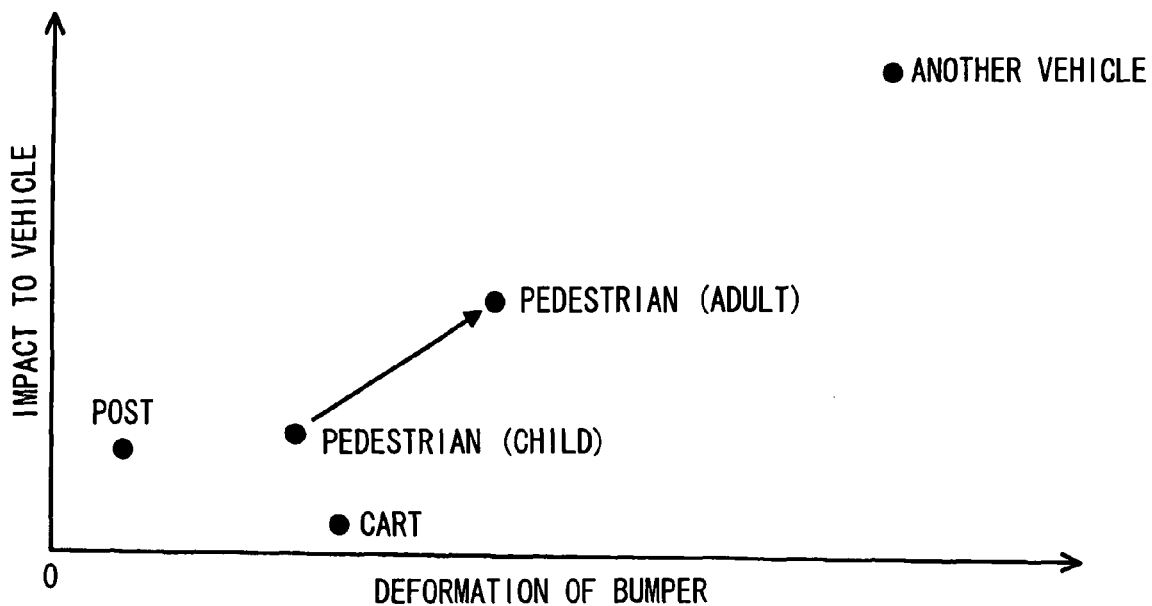
FIG. 14 is a graph showing relationship between deformation of a bumper caused by an object colliding with a vehicle and an impact applied to the vehicle.

When the bumper collides with an object, the bumper deforms. An impact is applied to the vehicle. Deformation of the bumper and an impact applied to the vehicle depend on an object to be collided with and are correlated with each other. As shown in FIG. 14, for example, collision with a low safety post on the roadside causes a small maximum deformation value for the bumper and a large maximum impact applied to the vehicle. Collision with a tall shopping cart causes a large maximum deformation value for the bumper and a small maximum impact applied to the vehicle. Collision with another vehicle causes large maximum values for both the bumper deformation and the impact applied to the vehicle. Collision with a pedestrian causes a maximum deformation value for the bumper to be greater than that for collision with the safety post and elsewhere and smaller than that for collision with the vehicle. Collision with a pedestrian causes a maximum impact applied to the vehicle to be greater than that for collision with the shopping cart and to be smaller than that for collision with the vehicle. Increasing the age of the pedestrian from a child to an adult also increases maximum values for both the bumper deformation and the impact applied to the vehicle. The two-dimensional map of the bumper deformation and an impact applied to the vehicle shows an area containing points determined by maximum values resulting from collision with a pedestrian. This area differs from the other area containing points determined by maximum values resulting from collision with the other objects. Collision with a pedestrian can be determined by determining which area of the two-dimensional map contains a point determined by maximum values for the first parameter equivalent to the bumper deformation and the second parameter equivalent to an impact applied to the vehicle. In addition, it is possible to fully use the correlation between the bumper deformation and the impact applied to the vehicle and improve the determination accuracy compared to the prior art.

The bumper deformation is also proportional to a load or a pressure applied to the bumper. An impact applied to the vehicle is proportional to an acceleration applied to the vehicle. The first parameter equivalent to the bumper deformation can be calculated based on a load or a pressure. The second parameter equivalent to an impact applied to the vehicle can be calculated based on an acceleration. Collision with a pedestrian can be determined based on the bumper deformation or a load or a pressure applied to the bumper and an acceleration applied to the vehicle.

In the pedestrian collision detection apparatus of the first aspect, the bumper sensor may be a load sensor that detects a load applied to the bumper. The first parameter may be a load applied to the bumper, and the second parameter may be a vehicle velocity change due to a collision. This configuration can reliably calculate the first parameter equivalent to the bumper deformation and the second parameter equivalent to an impact applied to the vehicle. The bumper deformation is proportional to a load applied to the bumper. An impact applied to the vehicle is proportional to a vehicle velocity change due to collision. Accordingly, an output from the bumper sensor can be used to calculate the load applied to the bumper as the first parameter equivalent to the bumper deformation. In addition, an output from the acceleration sensor can be used to calculate a vehicle velocity change due to collision as the second parameter equivalent to the impact applied to the vehicle.

In the pedestrian collision detection apparatus of the first aspect, the bumper sensor may be a load sensor that detects a load applied to the bumper. The first parameter may be a mass of a colliding object, and the second parameter may be a vehicle velocity change due to a collision. This configuration can reliably calculate the first parameter equivalent to the bumper deformation and the second parameter equivalent to an impact applied to the vehicle. The bumper deformation is proportional to a mass of a colliding object. The object mass can be calculated based on a load applied to the bumper. An impact applied to the vehicle is proportional to a vehicle velocity change due to collision. Accordingly, an output from the bumper sensor can be used to calculate the mass of the colliding object as the first parameter equivalent to the bumper deformation. In addition, an output from the acceleration sensor can be used to calculate a vehicle velocity change due to collision as the second parameter equivalent to the impact applied to the vehicle.

In the configuration just above, the first parameter may be calculated based on time integration of an output from the bumper sensor. This can reliably calculate a mass of a colliding object as the first parameter. The object mass can be calculated by integrating a load applied to the bumper. The mass of the colliding object can be reliably calculated.

In the pedestrian collision detection apparatus of the first aspect, the bumper sensor may be a pressure sensor that detects a pressure applied to the bumper. The first parameter may be a pressure applied to the bumper, and the second parameter may be a vehicle velocity change due to a collision. This configuration can reliably calculate the first parameter equivalent to the bumper deformation and the second parameter equivalent to an impact applied to the vehicle. The bumper deformation is proportional to a pressure applied to the bumper. An impact applied to the vehicle is proportional to a vehicle velocity change due to collision. Accordingly, an output from the bumper sensor can be used to calculate the pressure applied to the bumper as the first parameter equivalent to the bumper deformation. In addition, an output from the acceleration sensor can be used to calculate a vehicle velocity change due to collision as the second parameter equivalent to the impact applied to the vehicle.

In the pedestrian collision detection apparatus of the first aspect, the bumper sensor may be a pressure sensor that detects a pressure applied to the bumper. The first parameter may be a mass of a colliding object, and the second parameter may be a vehicle velocity change due to a collision. This configuration can reliably calculate the first parameter equivalent to the bumper deformation and the second parameter equivalent to an impact applied to the vehicle. The bumper deformation is proportional to a mass of a colliding object. The object mass can be calculated based on a load applied to the bumper. An impact applied to the vehicle is proportional to a vehicle velocity change due to collision. Accordingly, an output from the bumper sensor can be used to calculate the mass of the colliding object as the first parameter equivalent to the bumper deformation. In addition, an output from the acceleration sensor can be used to calculate a vehicle velocity change due to collision as the second parameter equivalent to the impact applied to the vehicle.

In the pedestrian collision detection apparatus of the first aspect, the bumper sensor may be a distance sensor that detects bumper deformation. The first parameter may be a bumper deformation (i.e., deformation quantity), and the second parameter may be a vehicle velocity change due to a collision. This configuration can reliably calculate the first parameter equivalent to the bumper deformation and the second parameter equivalent to an impact applied to the vehicle. The bumper deformation is found as a deformation quantity. An impact applied to the vehicle is proportional to a vehicle velocity change due to collision. Accordingly, an output from the bumper sensor can be used to calculate the bumper deformation quantity as the first parameter equivalent to the bumper deformation. In addition, an output from the acceleration sensor can be used to calculate a vehicle velocity change due to collision as the second parameter equivalent to the impact applied to the vehicle.

In the pedestrian collision detection apparatus of the first aspect or any above optional aspect, a pedestrian collision determination unit may output a start signal for starting a pedestrian protection apparatus if detecting collision with a pedestrian. This configuration can protect the pedestrian colliding with a vehicle.

In the configuration just above, the pedestrian collision detection apparatus may further include a vehicle speed sensor for detecting a vehicle speed. The pedestrian collision determination unit may determine a collision with a pedestrian when a vehicle speed detected by a vehicle speed sensor is within a specified range. This configuration can appropriately start the pedestrian protection apparatus and reliably protect the pedestrian colliding with the vehicle. When the vehicle collides with the pedestrian at a low speed, a small impact is applied to the pedestrian. In such case, there is little need for starting the pedestrian protection apparatus; therefore, starting the pedestrian protection apparatus may adversely affect vehicle operations. When the vehicle collides with the pedestrian at a high speed, the pedestrian may be hit seriously. The pedestrian protection apparatus cannot protect the pedestrian. To solve this problem, the pedestrian collision determination unit determines collision with the pedestrian when a vehicle speed belongs to the specified range. The pedestrian protection apparatus can appropriately start and reliably protect the pedestrian colliding with the vehicle.

As a second aspect, a pedestrian collision detection apparatus for a vehicle includes a bumper sensor, a speed sensor, an acceleration sensor, and a pedestrian collision determination unit. The bumper sensor is configured to detect a load or a pressure applied to a bumper of the vehicle. The speed sensor is configured to detect a speed of the vehicle. The acceleration sensor is configured to detect an acceleration of the vehicle. The pedestrian collision determination unit is configured to include a two-dimensional map for defining a correlation between a first parameter and a second parameter when colliding with a pedestrian. The first parameter is equivalent to a deformation of the bumper calculated based on outputs from the bumper sensor and the vehicle speed sensor, while the second parameter is equivalent to an impact applied to the vehicle calculated based on an output from the acceleration sensor. The pedestrian collision determination unit is further configured to determine a collision with a pedestrian when a specified area of the two-dimensional map contains a point determined by a calculated maximum value for the first parameter and a calculated maximum value for the second parameter.

This configuration can accurately distinguish collision between a vehicle and a pedestrian from collision between the vehicle and the other object(s) and reliably detect the collision. Collision with a pedestrian can be determined by determining which area of the two-dimensional map contains a point determined by maximum values for the first parameter equivalent to the bumper deformation and the second parameter equivalent to an impact applied to the vehicle. The first parameter equivalent to the bumper deformation can be calculated based on a load or a pressure applied to the bumper and a vehicle speed. The first parameter can be more accurately calculated in consideration for a vehicle speed. The second parameter equivalent to an impact applied to the vehicle can be calculated based on an acceleration. Collision with a pedestrian can be more accurately determined based on a load or a pressure applied to the bumper, a vehicle speed, and an acceleration applied to the vehicle.

In the pedestrian collision detection apparatus of the second aspect, the bumper sensor may be a load sensor that detects a load applied to the bumper. The first parameter may be a mass of an object colliding with the bumper, and the second parameter may be a vehicle velocity change due to a collision. This configuration can reliably calculate the first parameter equivalent to a bumper deformation and the second parameter equivalent to an impact applied to the vehicle. The bumper deformation is proportional to a mass of a colliding object. The object mass can be calculated based on a load applied to the bumper and a vehicle speed. The object mass can be more accurately calculated in consideration for a vehicle speed. An impact applied to the vehicle is proportional to a vehicle velocity change due to collision. Accordingly, outputs from the bumper sensor and the vehicle speed sensor can be used to calculate the mass of the colliding object as the first parameter equivalent to the bumper deformation. In addition, an output from the acceleration sensor can be used to calculate a vehicle velocity change due to collision as the second parameter equivalent to the impact applied to the vehicle.

In the configuration just above, the first parameter may be calculated based on (i) an integration value resulting from time integration of an output from the bumper sensor and (ii) an output from the vehicle speed sensor. This configuration can more accurately and reliably calculate a mass of colliding object as the first parameter. The object mass can be calculated based on (i) an integration value of a load applied to the bumper and (ii) a vehicle speed. For example, the object mass can be calculated by dividing an integration value of the load by the vehicle speed. The object mass can be more accurately calculated in consideration for a vehicle speed. The mass of a colliding object can be reliably calculated.

In the pedestrian collision detection apparatus of the second aspect, the bumper sensor may be a pressure sensor that detects a pressure applied to the bumper. The first parameter may be a mass of an object colliding with the bumper, and the second parameter may be a vehicle velocity change due to a collision. This configuration can reliably calculate the first parameter equivalent to a bumper deformation and the second parameter equivalent to an impact applied to the vehicle. The bumper deformation is proportional to a mass of a colliding object. The object mass can be calculated based on a pressure applied to the bumper and a vehicle speed. The object mass can be more accurately calculated in consideration for a vehicle speed. An impact applied to the vehicle is proportional to a vehicle velocity change due to collision. Accordingly, outputs from the bumper sensor and the vehicle speed sensor can be used to calculate the mass of the colliding object as the first parameter equivalent to the bumper deformation. In addition, an output from the acceleration sensor can be used to calculate a vehicle velocity change due to collision as the second parameter equivalent to the impact applied to the vehicle.

In the pedestrian collision detection apparatus of the second aspect, the pedestrian collision determination unit may output a start signal for starting a pedestrian protection apparatus when detecting a collision with a pedestrian. This configuration can protect the pedestrian colliding with the vehicle.

In the configuration just above, the pedestrian collision determination unit may determine a collision with a pedestrian when a vehicle speed detected by the vehicle speed sensor is within a specified range. As mentioned above, this configuration can appropriately start the pedestrian protection apparatus and reliably protect the pedestrian colliding with the vehicle.

In the pedestrian collision detection apparatus of the first, second, or any their optional aspect above, the second parameter may be calculated based on time integration of an output from the acceleration sensor. This configuration can more reliably calculate a vehicle velocity change due to collision as the second parameter. The velocity change can be calculated by integrating an acceleration applied to the vehicle. It is possible to reliably calculate the vehicle velocity change due to collision.

In the pedestrian collision detection apparatus of the first, second, or any their optional aspect above, the pedestrian collision determination unit may determine a collision with a pedestrian when at least one of the first and second parameters is maximized and then decreases to a value indicative of a specified ratio to the maximum value. This configuration can reliably specify maximum values for the first and second parameters. It is possible to eliminate an incorrect determination due to a value other than the maximum value. When the bumper collides with an object, the bumper is deformed and applies an impact to the vehicle. The bumper deformation and the impact applied to the vehicle increase with time, are maximized almost at the same time, and then decrease. It is possible to reliably specify maximum values for the first and second parameters by confirming that at least one of the first parameter equivalent to the bumper deformation and the second parameter equivalent to the impact applied to the vehicle is maximized and then decreases to a value indicative of a specified ratio to the maximum value. This makes it possible to eliminate an incorrect determination due to a value other than the maximum value.

As yet another aspect, a pedestrian protection system includes the pedestrian collision detection apparatus according to any one of the above aspects and a pedestrian protection apparatus. The pedestrian protection apparatus reduces an impact to a pedestrian colliding with the vehicle. This configuration can accurately distinguish collision between the vehicle and the pedestrian from collision between the vehicle and the other object(s) and reliably protect the pedestrian.

It will be obvious to those skilled in the art that various changes may be made in the above-described embodiments of the present invention. However, the scope of the present invention should be determined by the following claims.

What is claimed is:

1. A pedestrian collision detection apparatus for a vehicle, the apparatus comprising:
a bumper sensor configured to detect a deformation of a bumper of the vehicle, a load applied to the bumper, or a pressure applied to the bumper;
an acceleration sensor configured to detect an acceleration of the vehicle; and
a pedestrian collision determination unit configured to include a two-dimensional map for defining a correlation between a first parameter and a second parameter when colliding with a pedestrian, the first parameter being equivalent to a deformation of the bumper calculated based on an output from the bumper sensor, the second parameter being equivalent to an impact applied to the vehicle calculated based on an output from the acceleration sensor, and further configured to determine a collision with a pedestrian when a specified area of the two-dimensional map contains a point determined by a calculated maximum value for the first parameter and a calculated maximum value for the second parameter.

2. The pedestrian collision detection apparatus of claim 1, wherein:
the bumper sensor is a load sensor that detects a load applied to the bumper;
the first parameter is a load applied to the bumper; and
the second parameter is a vehicle velocity change due to a collision.

3. The pedestrian collision detection apparatus of claim 1, wherein:
the bumper sensor is a load sensor that detects a load applied to the bumper;
the first parameter is a mass of a colliding object; and
the second parameter is a vehicle velocity change due to a collision.

4. The pedestrian collision detection apparatus of claim 3, wherein:
the first parameter is calculated based on time integration of an output from the bumper sensor.

5. The pedestrian collision detection apparatus of claim 1, wherein:
the bumper sensor is a pressure sensor that detects a pressure applied to the bumper;
the first parameter is a pressure applied to the bumper; and
the second parameter is a vehicle velocity change due to a collision.

6. The pedestrian collision detection apparatus of claim 1, wherein:
the bumper sensor is a pressure sensor that detects a pressure applied to the bumper;
the first parameter is a mass of a colliding object; and
the second parameter is a vehicle velocity change due to a collision.

7. The pedestrian collision detection apparatus of claim 1, wherein:
the bumper sensor is a distance sensor that detects a deformation of the bumper;
the first parameter is a deformation of the bumper; and
the second parameter is a vehicle velocity change due to a collision.

8. The pedestrian collision detection apparatus of claim 1, wherein
the pedestrian collision determination unit outputs a start signal for starting a pedestrian protection apparatus when detecting a collision with a pedestrian.

9. The pedestrian collision detection apparatus of claim 8, further comprising:
a speed sensor for detecting a speed of the vehicle, wherein
the pedestrian collision determination unit determines a collision with a pedestrian when a speed detected by the speed sensor belongs to a specified range.

10. The pedestrian collision detection apparatus of claim 1, wherein
the second parameter is calculated based on time integration of an output from the acceleration sensor.

11. The pedestrian collision detection apparatus of claim 1, wherein
the pedestrian collision determination unit determines a collision with a pedestrian when at least one of the first and second parameters is maximized and then decreases to a value indicative of a specified ratio to the maximum value.

12. A pedestrian protection system comprising:
the pedestrian collision detection apparatus of claim 1; and
a pedestrian protection apparatus.

13. A pedestrian collision detection apparatus for a vehicle, the apparatus comprising:
a bumper sensor configured to detect a load or a pressure applied to a bumper of the vehicle;
a speed sensor configured to detect a speed of the vehicle;
an acceleration sensor configured to detect an acceleration of the vehicle; and
a pedestrian collision determination unit configured to include a two-dimensional map for defining a correlation between a first parameter and a second parameter when colliding with a pedestrian, the first parameter being equivalent to a deformation of the bumper calculated based on outputs from the bumper sensor and the vehicle speed sensor, the second parameter being equivalent to an impact applied to the vehicle calculated based on an output from the acceleration sensor, and further configured to determine a collision with a pedestrian when a specified area of the two-dimensional map contains a point determined by a calculated maximum value for the first parameter and a calculated maximum value for the second parameter.

14. The pedestrian collision detection apparatus of claim 13, wherein:
the bumper sensor is a load sensor that detects a load applied to the bumper;
the first parameter is a mass of an object colliding with the bumper; and
the second parameter is a vehicle velocity change due to a collision.

15. The pedestrian collision detection apparatus of claim 14, wherein
the first parameter is calculated based on (i) an integration value resulting from time integration of an output from the bumper sensor and (ii) an output from the speed sensor.

16. The pedestrian collision detection apparatus of claim 13, wherein:
the bumper sensor is a pressure sensor that detects a pressure applied to the bumper;
the first parameter is a mass of a colliding object; and
the second parameter is a vehicle velocity change due to a collision.

17. The pedestrian collision detection apparatus of claim 13, wherein
the pedestrian collision determination unit outputs a start signal for starting a pedestrian protection apparatus when detecting a collision with a pedestrian.

18. The pedestrian collision detection apparatus of claim 13, wherein
the pedestrian collision determination unit determines a collision with a pedestrian when a speed of the vehicle detected by the speed sensor belongs to a specified range.

19. The pedestrian collision detection apparatus of claim 13, wherein
the second parameter is calculated based on time integration of an output from the acceleration sensor.

20. The pedestrian collision detection apparatus of claim 13, wherein
the pedestrian collision determination unit determines a collision with a pedestrian when at least one of the first and second parameters is maximized and then decreases to a value indicative of a specified ratio to the maximum value.

21. A pedestrian protection system comprising:

the pedestrian collision detection apparatus of claim 13; and a pedestrian protection apparatus.

* * * * *